Patented Jan. 9, 1951

2,537,609

UNITED STATES PATENT OFFICE 2,537,609

MANUFACTURE OF INDOLE

Floyd Thaddeus Tyson, Wyncote, Pa.

No Drawing. Application December 23, 1949,
Serial No. 134,862

4 Claims. (Cl. 260—319)

This invention relates to an improved process for the manufacture of indole, and more particularly to a process of manufacturing indole wherein sodium o-toluide is reacted with carbon monoxide.

While various methods of preparing indole have been described [see, for instance, "Organic Synthesis," volume 23, pages 42 to 45 (1943)], these methods in general require starting materials which are either difficult to produce or not available in sufficient amounts to be used in the commercial synthesis of indole. Several of the processes employ metallic potassium which is quite expensive and is not generally available in quantities required for use in commercial synthesis. Furthermore, the use of metallic sodium and, to a much greater extent, the use of metallic potassium, requires great care in order to avoid fire or explosions. In the most convenient processes it is necessary to convert o-toluidine to formotoluidide as a separate step in the process. In a number of the processes alcohol such as methanol or tertiary butanol are employed to react with the metallic sodium or potassium. As a substitute for the potassium alcoholate one author has suggested the use of potassium hydroxide and a water entraining medium such as benzene. These processes in general require large volumes for the preparation of the alkali metal derivatives of the o-formotoluidides. Where the o-formotoluidide is employed, it must be prepared as a separate step in the reaction by reacting o-toluidine with formic acid.

It is an object of this invention to provide an improved process for the manufacture of indole wherein sodium o-toluide is converted directly to indole in a simple and economical manner. It is a further object of the invention to provide a simple and relatively economical process for the preparation of indole directly from o-toluidine by converting it to the sodium o-toluide by reaction with sodium hydride, and without isolation converting the sodium o-toluide to indole.

I have found that indole can be produced directly from sodium o-toluide in a simple and economical manner by reacting it with carbon monoxide, preferably under pressure and at temperatures of from 150° to 400° C. The sodium o-toluide is preferably produced by reacting o-toluidine with sodium hydride, and this reaction may be carried out as the first step in the process and without isolating the resulting sodium o-toluide. Starting from o-toluidine, the preferred method for producing the indole is carried out by adding sodium hydride to an excess of o-toluidine, heating until the evolution of hydrogen ceases, then cooling and releasing the pressure created by the hydrogen that is formed in the reaction, then charging the autoclave with carbon monoxide and reheating under carbon monoxide pressure to produce the sodium derivative of indole. When the reaction is completed, the charge is cooled to from 125° to 150° C., the pressure is released and the excess o-toluidine is distilled off. The charge is then cooled to approximately room temperature, diluted with water to decompose the sodium derivative, and the indole is steam distilled from the mass and collected from the distillate.

The following examples are given to illustrate a preferred method for carrying out the invention. The parts used are by weight unless otherwise designated.

Example 1

Into a stainless steel autoclave having a capacity equivalent to the volume of 1400 parts of water, there is charged 213 parts of o-toluidine to which is added under stirring 28.8 parts of sodium hydride. The autoclave is closed and the mixture is gradually heated under agitation to approximately 170° C., at which temperature it is held for one-half hour. The autoclave charge is cooled to room temperature and the pressure, which is caused by the hydrogen liberated in the reaction and which amounts to approximately 500 pounds per square inch, is slowly released. The autoclave is again closed and carbon monoxide is introduced until a pressure of approximately 440 pounds per square inch is obtained. The charge is then heated to from 300° to 310° C. under agitation and this temperature is maintained for one-half hour. The charge is cooled to 125°–150° C., the excess pressure is released, vacuum is slowly applied, and the excess o-toluidine is distilled off. The charge is then cooled to room temperature, diluted with water, and steam distilled. Approximately 33 parts of indole are collected from the steam distillate.

Example 2

Into a stainless steel autoclave, as used in Example 1, are charged 161 parts of o-toluidine and 28.8 parts of sodium hydride. The mixture is heated as in Example 1 to obtain the sodium derivative of o-toluidine, and after release of the hydrogen, carbon monoxide is forced into the autoclave until the pressure is 225 pounds per square inch. The autoclave charge is again heated and cooled as in Example 1, and 30 parts of indole are obtained upon steam distillation of the autoclave contents.

The sodium o-toluide may of course be made by any process desired, such as by reacting the toluidine with sodium metal, with a sodium alcoholate or sodium amide. The use of sodium hydride, however, is preferred since it is readily obtainable and involves no unnecessary hazards in its use. In general, an excess of o-toluidine is employed so as to give a more fluid mass. When sodium hydride is used, from 0.25 to 8 parts or more of o-toluidine may be used per part of sodium hydride. The latter reacts slowly even at room temperature but temperatures from 100° to 170° C. are more convenient. The sodium hydride may be added in several portions (followed by heating after each addition) in order to avoid sudden uncontrolled temperature rise and too rapid evolution of hydrogen. The sodium hydride may also be added slowly and continuously to hot o-toluidine with stirring.

The time required for reacting the o-toluidine with the sodium hydride will of course depend upon the particular temperatures employed. At temepratures below 170° C., a longer time will be required to complete the evolution of hydrogen. If the addition of sodium hydride is made at atmospheric pressure, the volumetric evolution of hydrogen may be used to determine when the reaction is completed. When the sodium hydride is added all at once and the autoclave is closed and heated, the development of maximum pressure will in general indicate the completion of the reaction.

While carbon monoxide is absorbed by the sodium o-toluide even at atmospheric pressure, the use of higher pressures is preferred such as from 250 to 450 pounds per square inch. The pressure of the carbon monoxide employed will in general depend upon the amount of free space above the charge in the autoclave. If the free space above the charge in the autoclave is sufficiently large and the carbon monoxide is supplied at high enough pressures, one filling of the autoclave with carbon monoxide, as in the examples, will ordinarily be sufficient; otherwise, additional carbon monoxide should be introduced after the first is used up. Alternatively, the carbon monoxide can be supplied continuously under pressure. The use of an initial pressure of from between 150 and 450 pounds per square inch is preferred. It is important that enough carbon monoxide be introduced to react completely with the sodium o-toluide.

The addition of potassium salts such as potassium acetate, potassium chloride or potassium fluoride, in addition to the sodium o-toluide, is often advantageous in increasing the yield of the indole. In general, equal molecular proportions of the potassium salts may be employed.

In working up the reaction mass containing the indole and excess of o-toluidine, the procedure given in the examples may be changed to advantage by subjecting the autoclave contents to steam distillation, thereby removing both indole and o-toluidine together. The distillate may then be treated with hydrochloric acid to dissolve the o-toluidine and extracted with ether to remove the indole.

While the mechanism of the reaction is not well understood, it is theorized that the sodium o-toluide on reaction with carbon monoxide is converted to the sodium derivative of o-formotoluidide which in turn is ring closed to produce the sodium derivative of indole and water. The mol of water liberated for each mol of indole would appear to react with one mol of sodium o-toluide to give the toluidine and sodium hydroxide so that any calculation of yield of indole resulting from the process should be based on the fact that the theoretical yield of indole is only one-half the number of mols of the sodium o-toluide actually employed.

The present process provides a method for producing indole in comparatively good yields and in a simple and economical manner. The use of metallic potassium with its attendant hazards in operation is avoided, and these materials are substituted by a less expensive reagent such as sodium hydride. The use of alcohols or the formation of the o-formotoluidide as a separate compound is also avoided, thus greatly simplifying the process. The volume of the reaction mixture required in the present process is relatively small, since no large quantities of diluents are required. The simplicity of the reaction permits it to be operated in a single reaction vessel and does not require elaborate distilling or decanting equipment.

I claim:

1. A process for preparing indole which comprises reacting sodium o-toluide in o-toluidine with carbon monoxide at temperatures of from 150° to 400° C., decomposing the sodium derivative of the indole which is formed by the addition of water, and isolating the resulting indole.

2. A process for the preparation of indole which comprises reacting o-toluidine with sodium hydride to produce a solution of sodium o-toluide in o-toluidine, adding carbon monoxide to the resulting solution at a temperature of from 150° to 400° C. until reaction ceases, decomposing the sodium derivative of the indole which is formed with water, and isolating the resulting indole.

3. A process for preparing indole which comprises reacting sodium o-toluide in o-toluidine with carbon monoxide under pressures of from 150 to 450 pounds per square inch and at temperatures of from 150° to 400° C., decomposing the sodium derivative of the indole which is formed by the addition of water, and isolating the resulting indole.

4. A process for the preparation of indole which comprises reacting o-toluidine with sodium hydride to produce a solution of sodium o-toluide in o-toluidine. adding carbon monoxide to the resulting solution under pressures of from 150 to 450 pounds per square inch and at a temperature of from 150° to 400° C. until reaction ceases, decomposing the sodium derivative of the indole which is formed with water, and isolating the resulting indole.

FLOYD THADDEUS TYSON.

REFERENCES CITED

The following references are of record in the file of this patent:

UNITED STATES PATENTS

| Number | Name | Date |
| --- | --- | --- |
| 2,442,952 | Kitchens | June 8, 1948 |